(No Model.)

P. V. LAWSON & W. L. FIELD.
PULLEY.

No. 407,866. Patented July 30, 1889.

Witnesses.
A. V. Richardson
G. N. Utz

Inventors.
P. V. Lawson
Wallace L. Field
By their Atty. G. H. Albee.

UNITED STATES PATENT OFFICE.

P. V. LAWSON AND WALLACE L. FIELD, OF MENASHA, WISCONSIN.

PULLEY.

SPECIFICATION forming part of Letters Patent No. 407,866, dated July 30, 1889.

Application filed January 18, 1889. Serial No. 296,789. (No model.)

*To all whom it may concern:*

Be it known that we, P. V. LAWSON and WALLACE L. FIELD, citizens of the United States, and residents of Menasha, in the county of Winnebago and State of Wisconsin, have invented a new and useful Improvement in Pulleys, of which the following is a specification.

Our invention relates to pulleys which are designed for general use in mechanical devices for the purpose of transferring motive power from one shaft to another; and the object of our improvement is to produce a pulley of light weight—one that can be quickly attached to or removed from a line of shafting and that can be manufactured at a comparatively low cost. We attain these objects by the construction shown in the accompanying drawings, in which—

Figure 1:
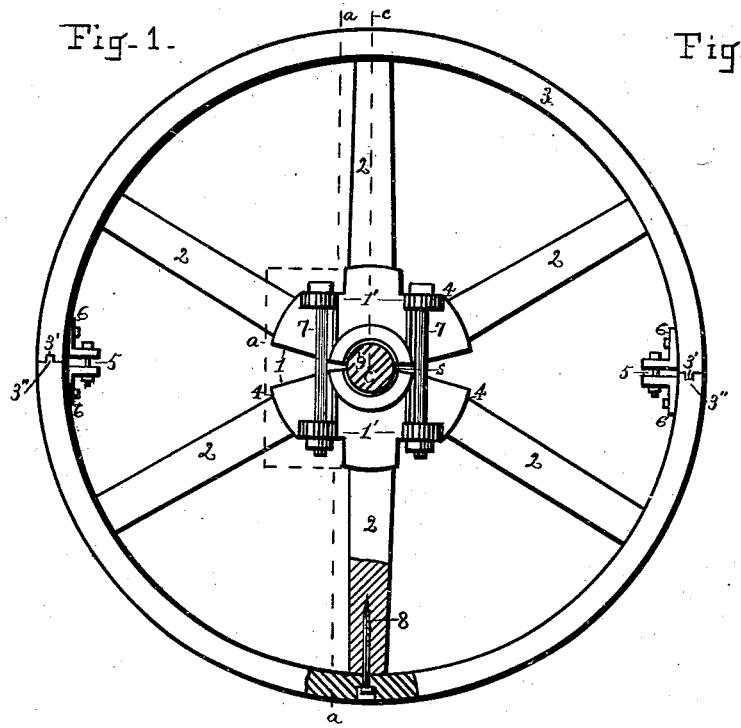
Figure 2:
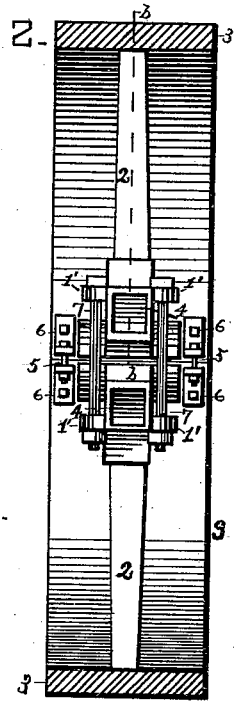
Figure 3:
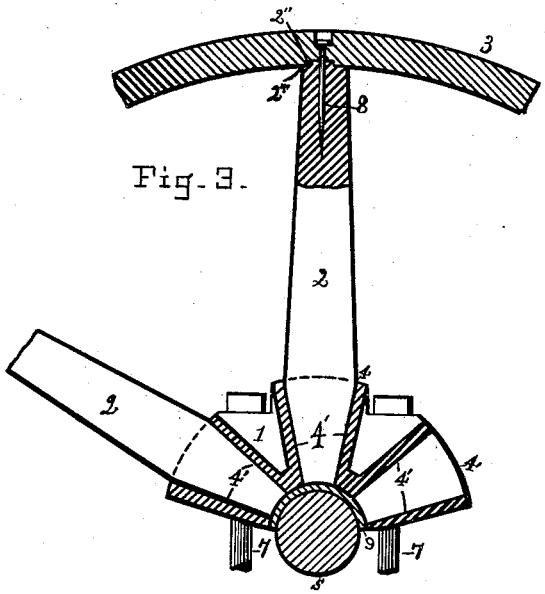
Figure 4:
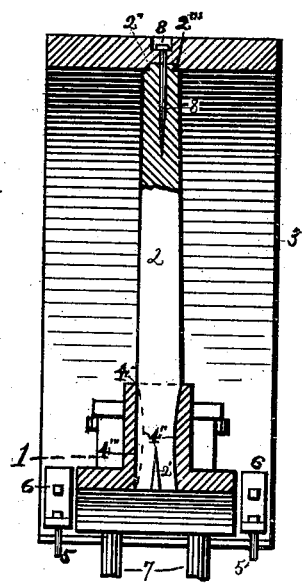

Figure 1 is an end elevation of the pulley, the outer end of one of the arms or spokes and the point of its connection with the pulley-rim being in section and showing the manner of connecting said points, the shaft S being also in section. Fig. 2 is a vertical section of the pulley on the line $a\ a$ of Fig. 1, a side view of the hub being shown and the arms or spokes which said line cuts being omitted. Figs. 3 and 4 are detail views upon an enlarged scale and in section, both showing the sockets in the hub for the spokes and the tenon upon the spoke's outer extremity, the former one upon the line $b\ b$ of Fig. 2 and the latter upon the line $c\ c$ of Fig. 1.

Similar figures of reference indicate like parts in the several views.

In the drawings, the figure 1 indicates the hub of the pulley, 2 its spokes, and 3 its rim. The hub is constructed of metal, the spokes of wood, and the rim of wood bent to the circle of the pulley, the grain of the wood in the rim running in the direction of its circumference, the pulley being divided through its hub and rim longitudinally with its bore into two equal parts and the parts secured one to the other and upon a shaft with bolts which connect the two parts of the hub and clamp them upon a shaft, the rim-sections also having bolts which connect them together.

The hub 1 consists of two similar pieces, each piece having spoke-sockets 4 formed therein for the reception of the spokes 2, the sides of the sockets transversely with the bore of the hub being straight, as shown in Fig. 3 at 4′, and the sockets wider at the circumference of the hub than at its bore. Upon the opposite sides, or those parallel with its bore, a curve or swell inward is produced, as shown by the heavy and dotted lines 4″ in Fig. 4. If preferred, one of these sides of the socket may be made straight, as shown by the heavy line 4‴, the entire contraction of the socket in this direction at an intermediate point of its depth being produced by the inward curve of only one side of the socket. The inner ends of the spokes are properly fitted and driven into the sockets, the inward curve therein compressing the wood, and a wedge 2′ being driven into their inner end firmly secures the spokes therein. Upon each half of the hub ears 1′ 1′ are formed, through which the bolts 7 7 are inserted and secure the parts together. At the outer ends of the spokes they are connected with the pulley-rim 3 by having a coach-screw 8 inserted through the rim and screwed into the end of the spoke.

A modification of connecting the rim to the spokes is shown in Fig. 3, whereby the pulley is better adapted to withstand rough usage and the strain produced by the action thereon of heavy belts.

At the outer extremity of the spokes a tenon 2″ and shoulder 2‴ are formed, the latter bearing against the inner surface of the pulley-rim and the tenon 2″ inserted in a seat formed for it in said rim. A hole is bored into the end of the spoke longitudinally with it and one corresponding with it from the aforementioned spoke seat to the outer surface of the rim, where it is countersunk and a coach-screw 8 inserted therein and into the spoke, whereby it is firmly secured to the pulley-rim.

The rim of the pulley is formed of two semicircular sections of the diameter, thickness, and width its purpose demands. Upon one end of each half-section of the rim a tongue 3′ is formed, and upon one end of the corresponding half-section a groove 3″, into which the tongue 3' is inserted. The meeting ends of both half-sections are thus fitted together. Near their point of meeting lugs 6 6 are secured to the rim, through which are inserted bolts 5 5 for connecting the rim-sections together.

In applying the pulley to a shaft a bushing of paper 9, or other slightly-elastic material, is interposed between the hub-pieces and the shaft, the bolts 7 7 are tightened to the necessary degree, while the bolts 5 5 are made to bring the rim-sections together. The pulley, being thus clamped upon a shaft with the interposing bushing, is adapted to various sizes of shafting and to any place thereon without regard to key-seats therein, no keys or set-screws being required for its retention thereon.

After the formation of the pulley, as described, its outer surface or face has the countersunk and other holes filled by gluing pieces of wood therein, when it is turned to the required diameter and form of face, its edges cut to the desired width, and its entire outer surface smoothly polished.

We are aware that it is not new to make a separable pulley or one whereof its two parts are secured upon a shaft with bolts which clamp said parts together. Neither is it new to make one having a metallic hub and wooden spokes and rim. We therefore do not claim such a combination, broadly; but What we do claim, and desire to secure by Letters Patent, is—

1. In a separable pulley, the combination of a hub consisting of two equal parts having lugs thereon, bolts for clamping said parts together and upon a shaft, said hub having spoke-sockets formed therein, the sockets being rectangular in their cross-section, the two sides thereof lying parallel with the bore of the hub, converging rapidly as they approach said bore, and thereby limiting the entrance of said spoke, and one or both of the remaining sides being curved inwardly, whereby the sockets are made narrower in the direction parallel with the bore of the hub intermediate of their length than at either end thereof, spokes inserted in the sockets, and a wedge in the inner end of each spoke, and secured upon the outer end of the spokes a bent rim consisting of two semicircular sections, said sections being secured together at their ends with tie-plates and bolts, substantially as described.

2. In a separable pulley, the combination of a hub consisting of two equal parts having lugs thereon, bolts for clamping said parts together and upon a shaft, a bushing of paper or other slightly-elastic material interposed between said hub and shaft, said hub having spoke-sockets formed therein, the sockets being rectangular in their cross-section, the two sides thereof lying parallel with the bore of the hub converging rapidly as they approach said bore, and thereby limiting the entrance of said spoke, and one or both of the remaining sides being curved inwardly, whereby the sockets are made narrower in the direction parallel with the bore of the hub intermediate of their length than at either end thereof, spokes inserted in the sockets and a wedge in the inner end of each spoke, and secured upon the outer end of the spokes a bent rim consisting of two semicircular sections, said sections being secured together at their ends with tie-plates and bolts, substantially as described.

3. In a separable pulley, the combination of a hub consisting of two equal parts having lugs thereon, bolts for clamping said parts together and upon a shaft, said hub having spoke-sockets and spokes secured therein, upon the outer end of the spokes a bent rim consisting of two semicircular sections and having holes therein corresponding in position with the outer end of said spokes, the holes aforesaid being countersunk upon the outer surface of the rim, and a coach-screw inserted in each of said holes and engaging a spoke, thereby connecting the rim and spoke together, and tie-plates and bolts near the ends of the rim-sections for connecting one rim-section to the other, substantially as set forth.

4. In a separable pulley, the combination of a hub consisting of two equal parts having lugs thereon, bolts for clamping said parts together and upon a shaft, said hubs having spoke-sockets and spokes secured therein, said spokes having tenons upon their outer ends and shoulders thereto, a bent rim consisting of two semicircular sections having spoke-seats therein corresponding in position with the spoke-tenons aforesaid, there being a hole through each spoke-seat, a coach-screw therethrough and connecting a spoke therewith, the ends of the rim meeting in a tongue-and-groove joint, tie-plates upon each section, and bolts for securing one rim-section to the other, substantially as described.

5. A separable pulley comprising a hub consisting of two equal parts having lugs thereon, bolts for clamping said parts together and upon a shaft, a bushing of paper or other slightly-elastic material interposed between said hub and shaft, said hub having spoke-sockets formed therein, the sockets being rectangular in their cross-section, the two sides thereof lying parallel with the bore of the hub, converging rapidly as they approach said bore, and thereby limiting the entrance of said spoke, and one or both of the remaining sides being curved inwardly, whereby the sockets are made narrower in the direction parallel with the bore of the hub intermediate of their length than at either end thereof, spokes inserted in the sockets, and a wedge in the inner end of each spoke, there being tenons upon the outer ends of the spokes and shoulders thereto, a bent rim consisting of two semicircular sections and having spoke-seats therein corresponding in position with the spoke-tenons aforesaid, there being a hole through each spoke-seat, a coach-screw therethrough and connecting a spoke therewith, the ends of said rim-sections meeting in a tongue-and-groove joint, and tie-plates and bolts near the ends of the rim-sections for connecting one rim-section to the other, substantially as set forth.

P. V. LAWSON.
WALLACE L. FIELD.

Witnesses:
A. V. RICHARDSON,
G. H. UTZ.